(12) United States Patent
Zivkovic et al.

(10) Patent No.: US 11,228,601 B2
(45) Date of Patent: Jan. 18, 2022

(54) SURVEILLANCE-BASED RELAY ATTACK PREVENTION

(71) Applicant: Intel Corporation, Santa Clara, CA (US)

(72) Inventors: Zoran Zivkovic, Hertogenbosch (NL); Michael E. Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 514 days.

(21) Appl. No.: 15/926,982

(22) Filed: Mar. 20, 2018

(65) Prior Publication Data

US 2019/0044951 A1 Feb. 7, 2019

(51) Int. Cl.
*H04L 29/06* (2006.01)
*H04W 12/08* (2021.01)
(Continued)

(52) U.S. Cl.
CPC ............ *H04L 63/107* (2013.01); *G06F 21/32* (2013.01); *G06F 21/35* (2013.01); *G07C 9/00309* (2013.01); *G07C 9/253* (2020.01); *G07C 9/257* (2020.01); *H04L 67/22* (2013.01); *H04W 4/02* (2013.01); *H04W 12/08* (2013.01); *H04W 12/122* (2021.01); *H04W 12/68* (2021.01); *G06F 21/60* (2013.01); *G07C 9/26* (2020.01);
(Continued)

(58) Field of Classification Search
CPC ... H04L 63/107; H04L 63/0861; H04L 67/22; G07C 9/00309; G07C 9/26; G07C 2009/0096; G07C 2209/64; G07C 2009/00555; G07C 2009/00769; G07C 9/253; G07C 9/257; H04W 12/06; H04W 12/00524; H04W 12/00503; H04W 4/40; H04W 12/1202; H04W 12/00508; H04W 4/02; H04W 12/08; G06F 21/60; G06F 21/35; G06F 21/32
See application file for complete search history.

(56) References Cited

U.S. PATENT DOCUMENTS 8,976,005 B2* 3/2015 Zivkovic ................. B60R 25/20
340/5.61
9,367,833 B2* 6/2016 Cohen ................... H04L 9/3263
(Continued)

*Primary Examiner* — Khoi V Le
(74) *Attorney, Agent, or Firm* — Alliance IP, LLC

(57) ABSTRACT

In one embodiment, an apparatus comprises an antenna to receive one or more radio signals, wherein the antenna is associated with a proximity-based access portal. The apparatus further comprises a processor to: detect, based on the one or more radio signals, an access request from a first device, wherein the access request comprises a request to access the proximity-based access portal using an access token associated with an authorized device; determine, based on the one or more radio signals, that the first device is within a particular proximity of the proximity-based access portal; obtain a first motion history associated with movement detected near the proximity-based access portal; obtain a second motion history associated with movement detected by the authorized device; and determine, based on the first motion history and the second motion history, whether the movement detected near the proximity-based access portal matches the movement detected by the authorized device.

17 Claims, 9 Drawing Sheets

(51) Int. Cl.
  *G07C 9/00* (2020.01)
  *G06F 21/35* (2013.01)
  *G06F 21/32* (2013.01)
  *H04W 4/02* (2018.01)
  *H04L 29/08* (2006.01)
  *G07C 9/25* (2020.01)
  *H04W 12/68* (2021.01)
  *H04W 12/122* (2021.01)
  *G06F 21/60* (2013.01)
  *H04W 12/06* (2021.01)
  *H04W 4/40* (2018.01)
  *G07C 9/26* (2020.01)
  *H04W 12/63* (2021.01)
  *H04W 12/79* (2021.01)

(52) U.S. Cl.
  CPC ............... *G07C 2009/0096* (2013.01); *G07C 2009/00555* (2013.01); *G07C 2009/00769* (2013.01); *G07C 2209/64* (2013.01); *H04L 63/0861* (2013.01); *H04W 4/40* (2018.02); *H04W 12/06* (2013.01); *H04W 12/63* (2021.01); *H04W 12/79* (2021.01)

(56) References Cited

U.S. PATENT DOCUMENTS

| | | | |
|---|---|---|---|
| 9,569,605 B1* | 2/2017 | Schneider | G06F 21/45 |
| 9,734,787 B2* | 8/2017 | Chang | G06F 21/32 |
| 2009/0189736 A1* | 7/2009 | Hayashi | G06F 21/32 |
| | | | 340/5.81 |
| 2016/0098878 A1* | 4/2016 | Cabouli | H04L 63/0853 |
| | | | 340/5.52 |
| 2016/0127900 A1* | 5/2016 | Archibald | G06F 21/32 |
| | | | 726/7 |
| 2017/0278195 A1* | 9/2017 | Washio | G06Q 40/08 |
| 2018/0004927 A1* | 1/2018 | Lowe | G06F 21/34 |
| 2018/0158266 A1* | 6/2018 | Zizi | G07C 9/257 |

\* cited by examiner

SURVEILLANCE-BASED RELAY ATTACK PREVENTION

TECHNICAL FIELD

This disclosure relates in general to the field of computer security, and more particularly, though not exclusively, to relay attack prevention.

BACKGROUND

In some cases, an attacker may attempt to gain unauthorized access to a particular computing system or resource using a relay attack. For example, with respect to a proximity-based access portal, an attacker may launch a relay attack to "trick" the access portal into thinking that an authorized device is near the portal even though it actually is not, thus causing the access portal to grant access to the attacker. For example, the attacker may position one or more relay devices between the access portal and an authorized device that is not currently within the requisite access proximity of the access portal. In this manner, signals emitted by the authorized device may be relayed to the access portal via the relay devices, and in some cases the signals may also be modified by the relay devices, causing the access portal to mistakenly believe that the authorized device is nearby, and thus tricking the access portal into granting access to the attacker even though the authorized device is not actually within the requisite access proximity of the access portal.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
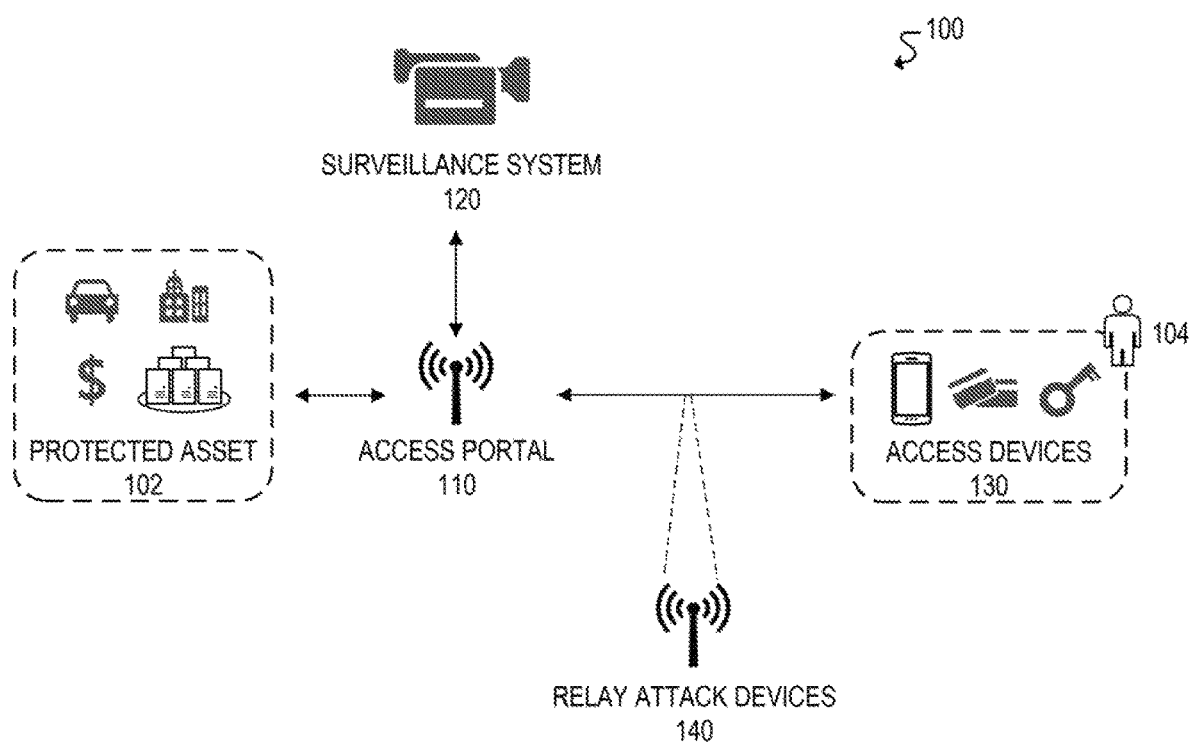
FIG. 1 illustrates an example embodiment of an access control system with surveillance-based relay attack prevention.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Example embodiments that may be used to implement the features and functionality of this disclosure will now be described with reference to the attached FIGURES.

Relay Attack Prevention for Access Control Systems

FIG. 1 illustrates an example embodiment of an access control system 100 with surveillance-based relay attack prevention. In the illustrated embodiment, access control system 100 includes a protected asset 102, a plurality of users 104, a proximity-based access portal 110, a surveillance system 120, and a plurality of access devices 130. In some embodiments, for example, the protected asset 102 may be a vehicle, building, payment system (e.g., for stores or vending machines), secured computing system, and/or any other type of asset that is subject to controlled access. Moreover, proximity-based access portal 110 may be used to control or manage access to the protected asset 102. In some embodiments, for example, proximity-based access portal 100 may grant access to the protected asset 102 only to authorized users 104 that are physically nearby. For example, in some embodiments, proximity-based access portal 100 may prohibit access to the protected asset 102 unless an access device 130 associated with an authorized user 104 is detected within close proximity of access portal 110. Access devices 130, for example, may include mobile phones, smart keys or key fobs, access cards, payment cards, RFID tags, and/or any other suitable type of access devices. Moreover, in some cases, access devices 130 may continuously and/or periodically emit wireless signals that contain access requests and/or access credentials associated with accessing the protected asset 102. Alternatively, an access portal 110 may trigger access devices 130 to send access requests and/or access tokens when the access devices 130 are detected within close proximity to the access portal 110 (e.g., based on signal strength). In this manner, access portal 110 may grant access to the protected asset 102 upon detecting access requests with valid access credentials from access devices 130 that are within close proximity of access portal 110.

In some embodiments, for example, an access request may contain an access token associated with a particular access device 130 and/or an associated user 104. Moreover, upon detecting the access request, access portal 110 may determine whether the specified access token is valid, and whether the associated access device 130 is located within a certain proximity or distance of access portal 110 (e.g., based on an analysis of the wireless signals transmitted by the access device 130). If the access token is valid and the associated access device 130 is determined to be within the requisite proximity of access portal 110, access portal 110 may grant access to the protected asset 102. Otherwise, access portal 110 may deny access to the protected asset 102.

In some cases, however, an attacker may attempt to circumvent the protection of a proximity-based access portal 110 using a relay attack. A relay attack, for example, may be designed to "trick" access portal 110 into thinking that an authorized access device 130 is nearby even though it actually is not, thus causing access portal 110 to grant an attacker access to the protected asset 102. For example, an attacker may position one or more relay attack devices 140 between access portal 110 and an authorized access device 130 located outside of the requisite access proximity of access portal 110. In some cases, for example, an attacker may position a first relay attack device 140 near the authorized access device 130 and a second relay attack device 140 near access portal 110. In this manner, signals emitted by the authorized access device 130 may be relayed to access portal 110 by the relay attack devices 140 (and vice versa), thus attempting to trick access portal 110 into granting access to the protected asset 102 even though the authorized access device 130 is not located within the requisite access proximity of access portal 110.

Accordingly, in the illustrated embodiment, proximity-based access portal 110 includes surveillance-based relay attack prevention functionality. For example, when an access request is detected from an authorized access device 130, access portal 110 may leverage sensors to verify that the environment detected near access portal 110 matches that of the authorized access device 130. In some embodiments, for example, access portal 110 may leverage a surveillance system 120 to detect certain aspects of the surrounding environment of access portal 110, such as movement and/or biometric information of users 104 near access portal 110. For example, surveillance system 120 may either be near access portal 110 and/or integrated with access portal 110, and surveillance system 120 may include one or more sensors to capture aspects of the surrounding environment of access portal 110. For example, in some embodiments, surveillance system 120 may include at least one camera to capture visual data associated with the surrounding environment of access portal 110. Moreover, access portal 110 may analyze the visual data to detect aspects of the surrounding environment, such as movement and/or biometric information (e.g., images and/or other visual representations) of users 104 detected near access portal 110.

Moreover, similar information may be detected or obtained by the associated access device 130. For example, the access device 130 may detect its own movement using one or more sensors, such as an accelerometer, location sensor, camera, and so forth. The access device 130 may also maintain biometric information associated with its authorized users 104, such as photos or images of the authorized users 104. For example, the access device 130 may use a camera to capture images of authorized users 104 directly, or alternatively, the access device 130 may obtain existing images of the authorized users 104 from an external source.

In this manner, the detected aspects of the surrounding environment of access portal 110 can be compared to the corresponding aspects of the authorized access device 130 to determine whether they match and/or are consistent with each other. For example, the motion history detected near access portal 110 may be compared to the motion history detected by the authorized access device 130, and/or an image of a user 104 detected near access portal 110 may be compared to an image of an authorized user of the access device 130. If the respective aspects match, it may be determined that the authorized access device 130 is in fact within the proximity of access portal 110 and therefore no relay attack is being attempted, and thus the access request may be granted. If the respective aspects do not match, however, additional safeguards or verifications may be employed to help determine whether the access request is legitimate, and/or it may ultimately be determined that the authorized access device 130 is not actually within the proximity of access portal 110 and therefore a relay attack is being attempted, and thus the access request may be denied.

In general, the components illustrated in FIG. 1, such as the various "systems," "devices," "assets," and/or "portals," may include electronic computing devices operable to receive, transmit, process, store, or manage data and information associated with system 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems. Computing devices may be further equipped with communication modules to facilitate communication with other computing devices over one or more networks and/or communication mediums.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
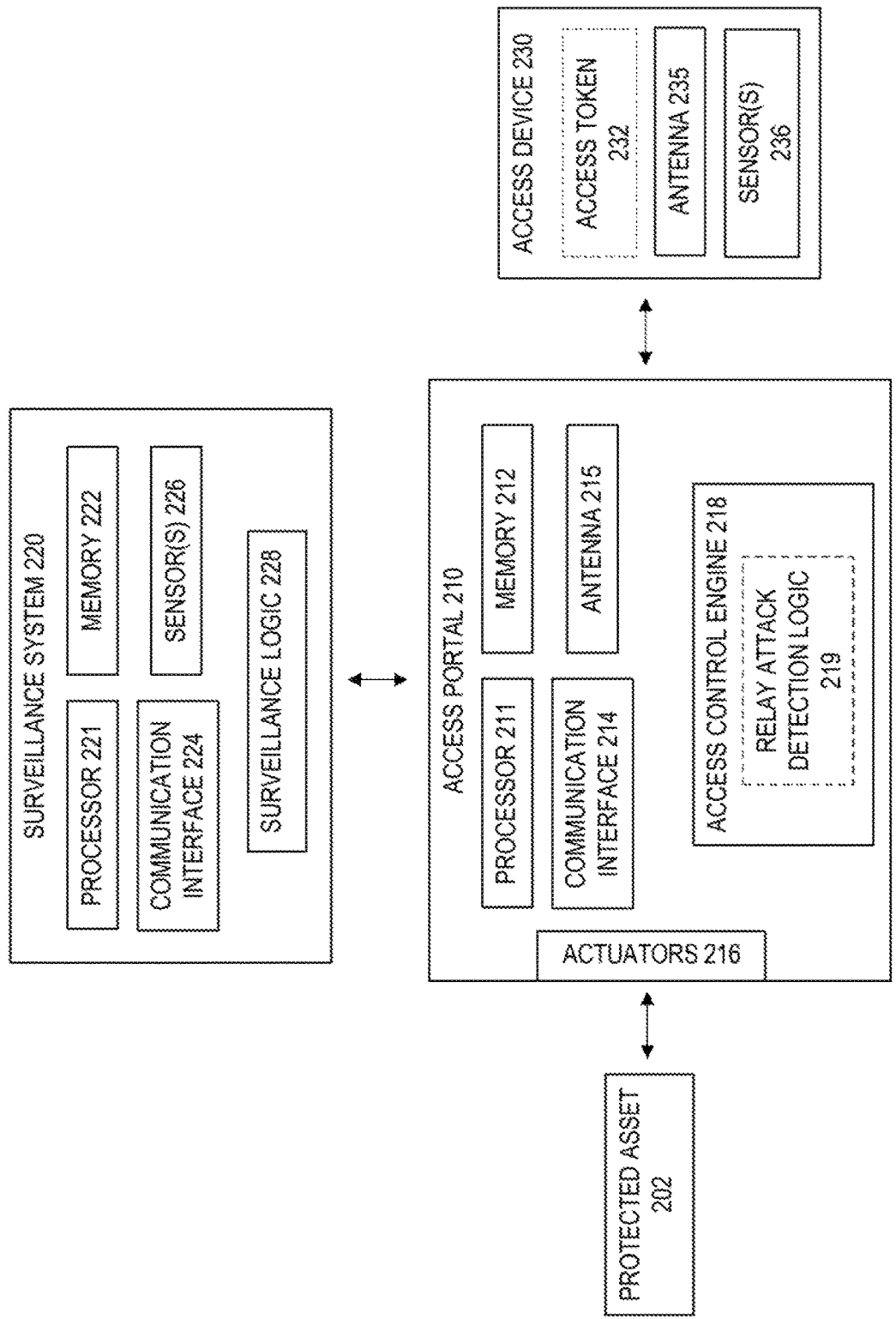
FIG. 2 illustrates a block diagram for an example access control system with surveillance-based relay attack prevention.

FIG. 2 illustrates a block diagram for an example access control system 200 with surveillance-based relay attack prevention. In the illustrated embodiment, access control system 200 includes a protected asset 202, a proximity-based access portal 210, a surveillance system 220, and one or more access devices 230.

The protected asset 202 may be any type of asset that is subject to access control, such as a vehicle, building, payment system (e.g., for stores or vending machines), secured computing system, and so forth. Moreover, in the illustrated embodiment, access to the protected asset 202 is controlled or managed by the access portal 210.

The access portal 210 includes one or more processors 211, one or more memory elements 212, a communication interface 214 for communicating with external components (such as a surveillance system 220), an antenna or reader 215 for communicating with nearby access devices 230, one or more actuators 216 for performing actions associated with a protected asset 202 (e.g., opening a door of a vehicle or building), and an access control engine 218 for managing access to the protected asset 202. Moreover, the access control engine 218 further includes relay attack detection logic 219 for detecting and preventing relay attacks based on data captured by an associated surveillance system 220, as described further throughout this disclosure.

The surveillance system 220 includes one or more processors 221, one or more memory or storage elements 222, a communication interface 224 for communicating with external components (such as the access portal 210), one or more sensors 226 (e.g., cameras and/or other biometric sensors) for capturing data associated with the surrounding environment, and surveillance logic 228 for detecting and tracking activity in the surrounding environment.

An access device 230 may include a mechanism for storing an associated access token 232, an antenna or transmitter 235 for communicating with a nearby access portal 210, and one or more sensors 236 for capturing data associated with the surrounding environment, such as motion and/or biometric information.

In the illustrated embodiment, the access portal 210 is used to regulate access to the protected asset 202 by one or more access devices 230. Moreover, the access portal 210 leverages the surveillance system 220 to detect potential relay attacks launched by attackers seeking to gain unauthorized access to the protected asset 202. Relay attacks are simple attacks based on the idea that, in some situations, signals from devices can be intercepted, relayed, and amplified to allow attackers to obtain unauthorized access to target systems. In some cases, attackers do not need to take any further action beyond simply relaying the signals. Further, due to their nature, relay attacks cannot be easily addressed by simply adding cryptographic mechanisms to the systems that are being attacked. Accordingly, proximity-based access portal 210 protects against relay attacks using a simple and effective approach, as described further below.

Proximity-based access control is a widely used access control technique. It is often used, for example, when accessing buildings, paying at shops, paying at vending machines, accessing vehicles, and so forth. In such systems, an access device 230 (such as an electronic key, bank card, or phone) uses an associated "access token" 232 to obtain access to an access control system otherwise referred to as an "access portal." The access token 232, for example, may be a public/private key pair associated with the access device 230 or with a user of the access device 230. Moreover, the access device 230 and/or its associated access token 232 are typically detected within the proximity of the access portal 210 based on the signals of a secure radio frequency communication channel. Such a channel is also used for checking the authenticity of the access token 232. If the access token 232 is valid and the access device 230 is "close enough" to the access portal 210, the portal 210 grants the holder of the access device 230 access to the protected asset 202. Proximity is usually determined by the strength of the communication channel. For example, the near field communication standard requires an access device to be in the near field of a reader device as determined based on wireless signal characteristics.

Systems that support proximity-based access typically do not require any further user interaction, such as the need to have a certain key pressed. Such practice, while convenient for users, introduces a significant security vulnerability, as proximity-based access systems are prone to a class of attacks called "relay attacks." The signal of an access device 230 can be easily intercepted, amplified, and relayed over one or multiple hops at any time. As a result, an attacker near the portal 210 may obtain access by simply relaying the signal from an access device 230 that is the true owner of a particular access token 232, which may be further away and may not be intending to access the portal 210 at the time of the attack. This type of malicious attack is performed by relaying the signals from the access device 230 (which contain the associated access token 232) using fake relay devices positioned in the vicinity of both the access device 230 and the access portal 210, thus fooling the access portal 210 into detecting a nearby device with a valid access token 232.

Furthermore, given that a user does not need to take any explicit action to initiate communication with an access portal 210, the user may be unaware that a signal containing its access token 232 is being intercepted and used for unauthorized portal access. For example, such relay attacks are enabled by the fact that the access device 230 and/or the access portal 210 are continuously sending beacons, without the need for any user action. Beacon signals can be relayed not only from access devices 230 toward the access portal 210, but in the opposite direction as well. In near-field communication, for example, an access device 230 reacts to the electrical field of the reader or antenna of an access portal 210, and in this way, a user may be completely unaware that a relay attack is in progress. Moreover, relay attacks are independent of the encryption protocol and cryptographic strength of the communication between the access device 230 and access portal 210, as the only action performed by the attacker is relaying encrypted messages and increasing the signal strength of those messages.

In some cases, relay attacks may be detected based on signal time-of-flight (ToF) information. For example, some proximity-based access systems may measure the distance between an access portal and an access device using time-of-flight information rather than signal strength measurements. Systems that rely on time-of-flight information, however, are typically expensive and require more power. Moreover, relay attack protection for time-of-flight systems can be compromised using advanced attack techniques that modify the shape of communication symbols. The embodiments described throughout this disclosure, however, are more general and can be used to improve the security of many existing proximity access systems, even those that are not based on time-of-flight principles. Further, the described embodiments can also leverage additional techniques (e.g., motion history tracking, biometric authentication using computer vision and/or machine learning) to protect against relay attacks. In some embodiments, for example, an access portal 210 may track the motion history of a nearby access device 230 (e.g., using surveillance system 220) and may compare it to the motion history measured by the access device 230 itself. Further, the access portal 210 may require the access device 230 to move beyond a certain threshold distance (e.g., a few meters, or a diameter around the portal 210 covered by the surveillance system 220) to protect against relay attacks based on trivial motion trajectories. In this manner, the access portal 210 may track the motion history of the access device 230 until sufficient movement has been detected. In some embodiments, these additional protections can improve the security of existing time-of-flight based systems and further simplify their design.

In the illustrated embodiment, for example, the access portal 210 protects against relay attacks using various enhancements to the communication protocol between the access portal 210 and the access devices 230, which are simple, effective, and are not based on adding cryptographic mechanisms to the communication. The basic principle is that if an access device 230 with a valid access token 232 is detected near the portal 210, then it is safe to assume that there is a person that has walked toward the portal 210. The movement of that person can be used as a unique signature that should match the corresponding movement of the access device 230 that truly owns an associated access token 232. However, given that these assumptions will be violated during a relay attack, motion detection can be leveraged by the access portal 210 and access devices 230 to detect relay attacks. Further, other biometric or visual data (e.g., captured near the access portal 210 using a surveillance system 220 and/or captured by sensors of an access device 230) can be used to provide additional protection.

The proposed protection mechanism extends the regular protocol by transmitting the physical movement history of an access device 230, as measured by the device itself, to the access portal 210. For example, the movement history of an access device 230 can be obtained using an accelerometer and/or GPS chip built into the access device. In this manner, the access portal 210 can check the validity of an access request by matching the device movement with movements of people detected around the access portal, such as movements detected in a building, parking lot, and so forth. If a match is found, then the access device 230 is authenticated and the access request is granted, otherwise the access request is denied. In most cases, the movement signature of an access device 230 is unique and difficult to clone, and can also be encrypted during transmission.

However, to address situations where movement history may not uniquely characterize the rightful owner of an access token 232 (e.g., if the associated access device 230 is stationary or otherwise immobile), the baseline protocol can be augmented with additional steps, such as tracking the motion history of an access device 230 until a certain threshold of movement is detected, and/or performing additional verifications by leveraging visual or other biometric information. The visual information may be associated with either the rightful token holder or the attacker, and can be used for exposing a relay attack, as described further throughout this disclosure.

In the illustrated embodiment, it is assumed that a surveillance system 220 is deployed near the access portal 210, or alternatively integrated within the access portal 210, to track movement and capture biometric information of people near the portal, such as a surveillance system associated with a building or parking lot. This is not an unrealistic assumption given that surveillance systems are already used around buildings, banks, offices, homes, shops, parking lots, private parking spaces, and so forth. It is also assumed that the access portal 210 can communicate with the surveillance system 220, which is similarly a realistic assumption. For example, in the case of building surveillance, communication with the entrance door only increases the overall security offered and thus is the type of feature that would naturally be promoted by surveillance companies. In the case of private vehicle parking surveillance, communication with a private surveillance system is similarly the type of feature that would naturally be promoted by surveillance companies. Further, in the case of public parking surveillance, such communication could be offered as a service (e.g., sending surveillance information to a customer's car), and could further be marketed or promoted explicitly for protecting against relay attacks.

In the illustrated embodiment, the information captured and/or communicated by the surveillance system 220 may include any of the following:

A signature or hash value computed based on a motion history of movement detected near the access portal 210. In this manner, the signature or hash value contains no actual underlying surveillance data. For example, a signature related to captured surveillance data could be produced using some known but difficult to reverse scheme. This approach is safe and can preserve privacy, such as by generating the signature based on raw motion data, or generating the signature based on visual or other biometric information in a privacy-preserving manner (e.g., using blurred faces). Furthermore, this approach can substantially save communication bandwidth resources, as a hash value or signature is typically much smaller than a sequence of motion and/or biometric data.

Raw motion history. This type of information typically can be represented without including sensitive or private data, and thus may be safe for communication even in its raw form.

Raw visual data. Visual data may be anonymized using well known techniques (e.g., faces removed using blurring techniques) to preserve privacy.

Transformed visual and/or motion data. Both visual and motion data can be anonymized using any transformation that is known on both sides (e.g., a transformation that enables the correlation to be computed, and/or a transformation that can be inverted).

Finally, it is assumed that the access devices 230 are equipped with some means of measuring their relative or absolute movements (e.g., using accelerometers and/or GPS). Most mobile devices have such capabilities. Further, inertial sensors that are capable of measuring relative movements are low power and small enough to be incorporated into any type of device, even a bank card or access card.

The relay attack functionality associated with access control system 200 is described further throughout this disclosure in connection with the remaining FIGURES. Moreover, in some implementations, the various illustrated components of access control system 200, and/or any other associated components, may be combined, or even further divided and distributed among multiple different systems. For example, in some implementations, access control system 200 may be implemented as multiple different systems with varying combinations of its respective underlying components (e.g., 202, 210, 220, 230). In the embodiment of access control system 200 illustrated in FIG. 2, for example, the protected asset 202, access portal 210, and surveillance system 220 are illustrated as separate or distinct components of access control system 200. In other embodiments, however, some or all of those components may be integrated or combined. For example, in some embodiments, the access portal 210 may be integrated or combined with the protected asset 202 and/or the surveillance system 220.

Figure 3:
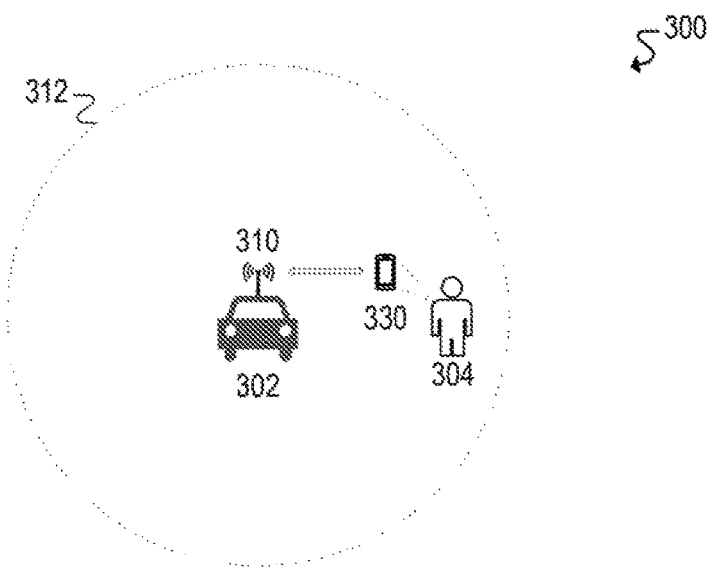
FIG. 3 illustrates an example of proximity-based access control.

FIG. 3 illustrates an example of proximity-based access control 300. The illustrated example includes a vehicle 302, a proximity-based access portal 310, a user 304, and an access device 330. In the illustrated example, the vehicle 302 is an asset protected by the proximity-based access portal 310, the user 304 is an individual authorized to use the vehicle 302 (e.g., the vehicle owner), and the access device 330 is a device carried by the user 304 to gain access to the vehicle 302 via the access portal 310. In some embodiments, for example, the access device 330 may be a smart key, key fob, secure access card, mobile phone, laptop, and/or any other suitable device for obtaining access to the vehicle 302 via the access portal 310. Moreover, while the protected asset is a vehicle 302 in the illustrated example, this example is similarly applicable to any other type of asset that is subject to access controls, such as a building, payment system, secure computing system, and so forth.

The illustrated example depicts a typical proximity-based access control scenario 300. In the illustrated example, a secure and encrypted wireless communication link is established between the access portal 310 of the vehicle 302 and the access device 330 of the user 304. In some embodiments, for example, either the access portal 310 or the access device 330 may be continuously emitting wireless signals or beacons, and thus once the devices become within close proximity to each other, an encrypted communication link may be established between them without any action required by the user 304. Moreover, the access device 330 may transmit its access credentials to the access portal 310 over the encrypted communication link, and the access portal 310 may then grant or deny access to the vehicle 302 after verifying whether the access credentials are valid and also whether the access device 330 is within a requisite proximity 312 of the access portal 310. In some embodiments, for example, the access credentials may be provided in the form of an access token that is associated with the access device 330 and/or an authorized user 304 of the access device 330.

In some embodiments, for example, the access protocol may be implemented using the following steps:

Step 1: The access device 330 attempts to communicate with the access portal 310 over an encrypted secure link. The communication is initiated without user intervention, for example, based on wireless beacons that are continuously transmitted by either the access device 330 or the access portal 310.

Step 2: If communication is possible, the access device 330 transmits its associated access token over the secure link, and the access portal 310 verifies whether the access token is valid.

Step 3: If the access token is valid, the access portal 310 determines the distance between the access device 330 and the access portal 310. In some embodiments, for example, the distance between the respective devices may be determined based on characteristics of the wireless signals transmitted between the devices, such as signal strength, signal phase, and/or signal timing information, among other examples.

Step 4: The measured distance is compared to a threshold distance to determine whether the access device 330 is within the requisite proximity 312 of the access portal 310. If the measured distance is less than the threshold distance, the access device 330 is assumed to be within the requisite proximity of the access portal 310, and the access portal 310 performs a certain action, such as unlocking or opening a door of the vehicle 302.

In this manner, the user 304 is provided with convenient proximity-based access to the vehicle 302 based on the communication between the access device 330 and the access portal 310. In some cases, however, this approach for proximity-based access control may be prone to "relay attacks," as described further in connection with FIG. 4.

Figure 4:
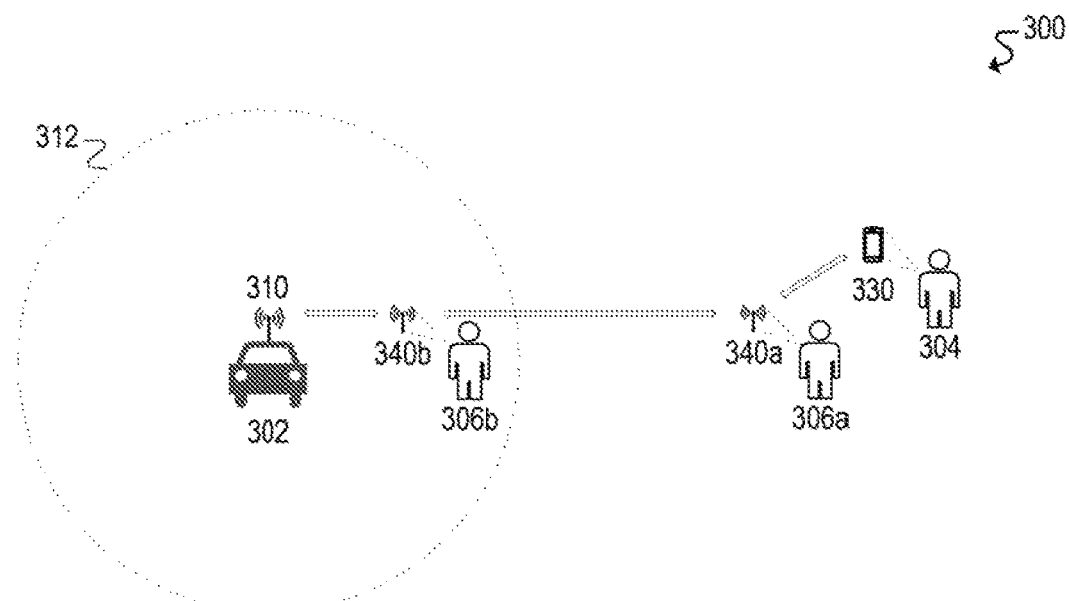
FIG. 4 illustrates an example of a relay attack for circumventing proximity-based access control.

FIG. 4 illustrates an example of a relay attack for circumventing proximity-based access control. In particular, the relay attack illustrated by FIG. 4 is designed to circumvent the proximity-based access control illustrated in FIG. 3.

In the illustrated example, the authorized user 304 and the associated access device 330 are located outside the requisite access proximity 312 of the access portal 310. Accordingly, a relay attack is used to "trick" the access portal 310 into thinking the access device 330 is within the requisite proximity 312 of the access portal 310 even though it actually is not, thus causing the access portal 310 to grant access to the attacker.

In the illustrated example, the relay attack is performed by two attackers 306a,b using two relay devices 340a,b. Each attacker 306a,b has an associated relay device 340a,b, and the first attacker 306a is positioned near the access device 330 of the authorized user 304, while the second attacker 306b is positioned near the access portal 310. In this manner, signals emitted by the access device 330 and/or the access portal 310 are relayed between those respective components by the relay devices 340a,b. For example, signals emitted by the access device 330 are received by the first relay device 340a, relayed from the first relay device 340a to the second relay device 340b, and then further relayed from the second relay device 340b to the access portal 310. Similarly, signals emitted by the access portal 310 are relayed to the access device 330 through the relay devices 340a,b in the reverse direction. In this manner, the access portal 310 and the access device 330 are able to communicate with each other even though they are far apart, thus allowing the access device 330 to transmit its access token to the access portal 310. Meanwhile, the access portal 310 mistakenly believes that the access device 330 is nearby (e.g., at the location where the second relay device 340b is deployed), and since the access token is valid, the access portal 310 is tricked into granting access to the attackers 306a,b.

A relay attack can also be performed by a single attacker rather than multiple attackers. For example, in some cases, a single attacker can simply deploy the respective relay devices at the appropriate locations ahead of time. Further, in some cases, a relay attack could be performed using a single relay device. For example, a single relay device could be used to modify wireless signals in a manner that tricks the access portal into thinking that an access device is closer than it actually is. For example, if an access portal relies on signal strength measurements to determine distances to access devices, the relay device could increase the signal strength of transmissions from an access device, thus causing the access portal to detect a smaller distance between itself and the access device. As another example, a single relay device positioned near the access portal could be designed with high sensitivity to enable communication with an access device over a greater distance.

The user 304 targeted by a relay attack is unaware of the attack since no user action is required. Moreover, using stronger encryption does not help mitigate against the attack, as the attack is simply based on relaying encrypted transmissions between two endpoints (e.g., by increasing the signal strength of the transmissions). For example, even when expensive and sophisticated time-of-flight relay attack detection is in place, the physical symbols of the encrypted transmissions can be modified without changing the encrypted message.

FIGS. 5A-D illustrate examples of surveillance-based relay attack prevention 500 for proximity-based access portals. In particular, the surveillance-based relay attack prevention 500 of FIGS. 5A-D is designed to prevent relay attacks against proximity-based access portals, such as the type of relay attack illustrated in FIG. 4.

The concept of surveillance-based relay attack prevention is based on a few basic principles. For example, if an access device is detected near a proximity-based access portal, then it is safe to assume that a person is nearby and has traveled towards the portal. Moreover, the types of access devices used with proximity-based access portals are typically already capable of measuring their own movement history, either in relative or absolute terms. For example, mobile phones typically include location sensors (e.g., GPS receivers) and inertial sensors (e.g., accelerometers). Location sensors can be used to track the absolute positions and movement of a device, while inertial sensors can be used to track relative movements of a device. Further, inertial sensors are typically low-power and small enough to incorporate into any type of device, even an access card or payment card. Finally, surveillance systems for tracking people are readily available and already in widespread use in many of the same contexts as proximity-based access portals, such as near buildings, parking lots, banks, stores, and so forth.

Accordingly, in some embodiments, surveillance systems deployed near access portals can be leveraged in conjunction with the sensing capabilities of access devices to detect relay attacks. For example, activity detected near an access portal can be matched against that of an associated access device to verify that the access device is in fact near the access portal, or otherwise determine that a potential relay attack may be in progress.

As described further below, FIGS. 5A-D each illustrate an alternative implementation of surveillance-based relay attack prevention 500.

Figure 5A:
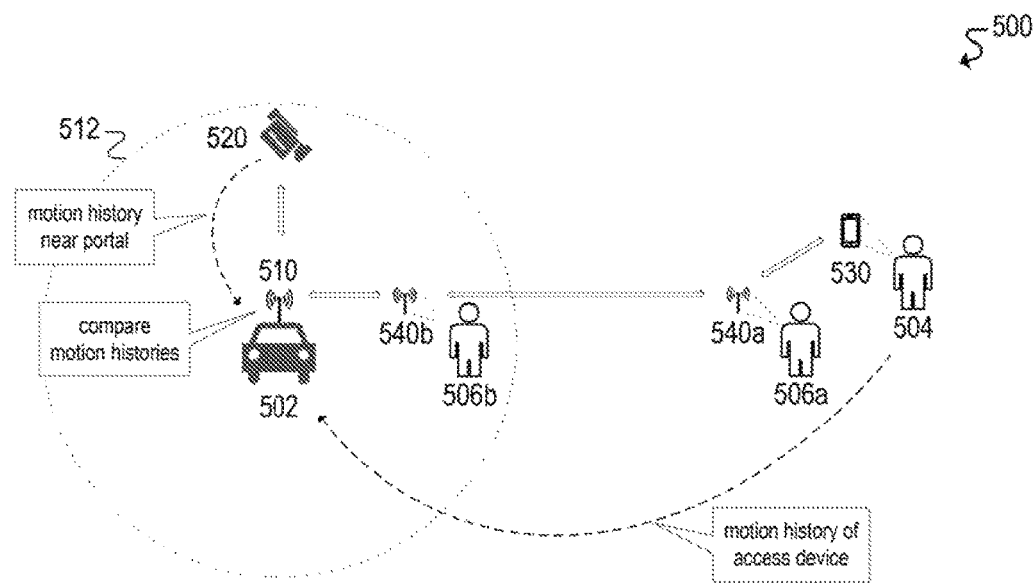
FIGS. 5A-D illustrate examples of surveillance-based relay attack prevention.

FIG. 5A illustrates an example of surveillance-based relay attack prevention 500 based on motion tracking. The illustrated example includes a vehicle 502, a proximity-based access portal 510, a surveillance system 520, a user 504, and an access device 530. The vehicle 502 is an asset protected by the proximity-based access portal 510, the surveillance system 520 is used to monitor activity near the access portal 510, the user 504 is an individual authorized to use the vehicle 502 (e.g., the vehicle owner), and the access device 530 is a device carried by the user 504 to gain access to the vehicle 502 via the access portal 510. Moreover, in some embodiments, the surveillance system 520 may be integrated with the vehicle 502 and/or the access portal 510 (e.g., as an external built-in camera of the vehicle 502), or alternatively the surveillance system 520 may be a separate or standalone system near the vehicle 502 and/or the access portal 510 (e.g., a surveillance system 520 in a parking lot).

In the illustrated example, the authorized user 504 and the associated access device 530 are located outside the requisite access proximity 512 of the access portal 510, and a relay attack is being attempted by two attackers 506a,b using relay devices 540a,b. The relay attack, however, is prevented using the surveillance-based relay attack prevention functionality described further below.

In the illustrated example, the access device 530 maintains a motion history of its recent movements (e.g., over the last few minutes). For example, the motion history of the access device 530 could be based on relative movement measured by an accelerometer. However, the motion history becomes more specific and the overall security is increased when additional information is included, such as information about absolute time, device 3D pose, absolute positions (e.g., based on GPS and/or other location sensors), and so forth. Intuitively, the protection level increases if the accuracy and precision of the motion history is increased.

Further, the surveillance system 520 is used to track people near the access portal 510. In some embodiments, for example, the surveillance system 520 may be used to track and maintain a motion history of the recent movement of every person around the portal over a certain period of time (e.g., over the last few minutes). Depending on the capabilities of the surveillance system 520, for example, the motion history may identify relative or absolute movement of each person detected near the access portal 510.

Moreover, in the illustrated example, when the access portal 510 detects an access request from the access device 530, movement detected near the access portal 510 (e.g., by the surveillance system 520) is compared with movement detected by the access device 530 to determine whether a potential relay attack is in progress. In some embodiments, for example, this relay attack prevention approach may be implemented using the following steps:

Step 1: The access device 530 attempts to communicate with the access portal 510 over an encrypted secure link. The communication is initiated without user intervention, for example, based on wireless beacons that are continuously transmitted by either the access device 530 or the access portal 510.

Step 2: If communication is possible, the access device 530 transmits its associated access token over the secure link, and the access portal 510 verifies whether the access token is valid.

Step 3: If the access token is valid, the access portal 510 determines the distance between the access device 530 and the access portal 510. In some embodiments, for example, the distance between the respective devices may be determined based on characteristics of the wireless signals transmitted between the devices, such as signal strength, signal phase, and/or signal timing information, among other examples.

Step 4: The measured distance is compared to a threshold distance to determine whether the access device 530 is potentially within the requisite proximity 512 of the access portal 510. If the measured distance is less than the threshold distance, the access device 530 is presumably within the requisite proximity of the access portal 510 unless a relay attack is in progress. Accordingly, prior to granting the access request, additional motion history checks are performed using the remaining steps to determine if a relay attack is in progress.

Step 5: The access device 530 sends its own measured motion history over the encrypted link to the access portal 510.

Step 6: The access portal 510 obtains the motion histories of every person near the access portal 510 based on data captured by the surveillance system 520.

In some embodiments, the motion histories may be limited to raw motion data (e.g., position coordinates) and may exclude intrusive information (e.g., images and/or video) to avoid potential privacy concerns. In this manner, the motion histories can be transmitted even by an external surveillance system 520 without compromising the privacy of people near the access portal 510.

Further, in some embodiments, various types of known transformations and/or obfuscation techniques may be applied to the motion data to prevent it from being linked to the surveillance data. In some embodiments, for example, the motion histories may be represented using hash values generated from the raw motion data and/or position coordinates.

Step 7: The access portal 510 analyzes the motion histories obtained from the surveillance system 520 to identify motions that are plausibly associated with persons approaching the access portal 510, and the motion history of each identified person is then compared with the motion history of the access device 530.

In some embodiments, for example, the comparison could be done by correlating 3D coordinates and time. For example, if the motion of the access device 530 matches the motion of a person approaching the portal 510 at the same time, then it may be determined that no relay attack is being performed. Accordingly, the access portal 510 may grant the access request by performing a certain action, such as unlocking or opening a door of the vehicle 502.

If no match is identified, however, then a relay attack could potentially be in progress, and thus the access request may be denied. Alternatively, in some embodiments, additional verifications may be performed before determining whether to grant or deny the access request (e.g., requesting and/or verifying additional identification information associated with the user 504), as described further below.

If the motion histories identify movements that are precise and absolute (e.g., using the GPS chip of an access device 530), then the protection described above will provide full protection against relay attacks. In some cases, however, the motion histories may be imprecise or may only identify relative movements (e.g., when using an accelerator of an access device 530 to save power). In such cases, an attacker may be able to fake a motion history that is based only on "trivial" movement. For example, a common situation that results in a "trivial" motion history is when a user 504 carrying the real access device 530 is standing still, or when the access device 530 is otherwise stationary. In this scenario, an attacker could approach the access portal 510 and remain there motionless for long enough so that the access device 530 and the surveillance system 520 both measure the same trivial motion history.

Accordingly, in some embodiments, additional safeguards may be implemented to protect against relay attacks that involve trivial motion trajectories. In some embodiments, for example, a system may determine that a motion history is trivial by comparing the motion history against a set of known trivial motion histories. In other embodiments, a system may classify a motion history as trivial by applying a set of rule-based checks on the specific features of the motion history. Yet, in other embodiments, a system may classify a motion history as trivial by employing a trained machine learning model and algorithm, such as a trained deep neural network. As an example, in some embodiments, rather than simply tracking the motion history over a fixed duration of a time, some threshold level of movement (e.g., a few meters) could be required. For example, the access device 530 could be required to move at least a few meters. In this manner, if the access device 530 does not move the minimum required distance, then the motion history may be determined to be trivial, and further verifications and/or identity checks may be performed before deciding whether to grant or deny the access request.

In some embodiments, for example, the user 504 of the access device 530 could be prompted to verify that the user is indeed attempting to access the access portal 510. Alternatively, to avoid requiring user interaction, an image or other biometric information of the person approaching the access portal 510 could be captured by the surveillance system 520 and sent to the access device 530. In this manner, the access device 530 can separately maintain a corresponding image or other biometric information of its true owner(s) or user(s), which can be compared to the data captured by the surveillance system 530 to determine if the person near the portal 510 is indeed the true owner of the access device 530.

Figure 5B:
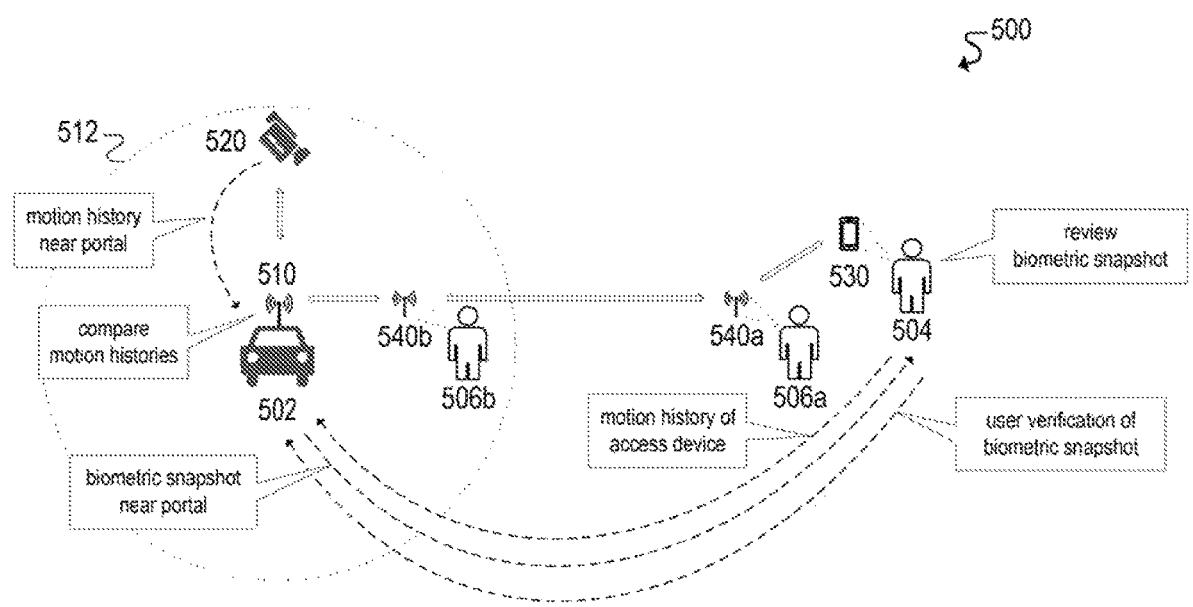
Figure 5C:
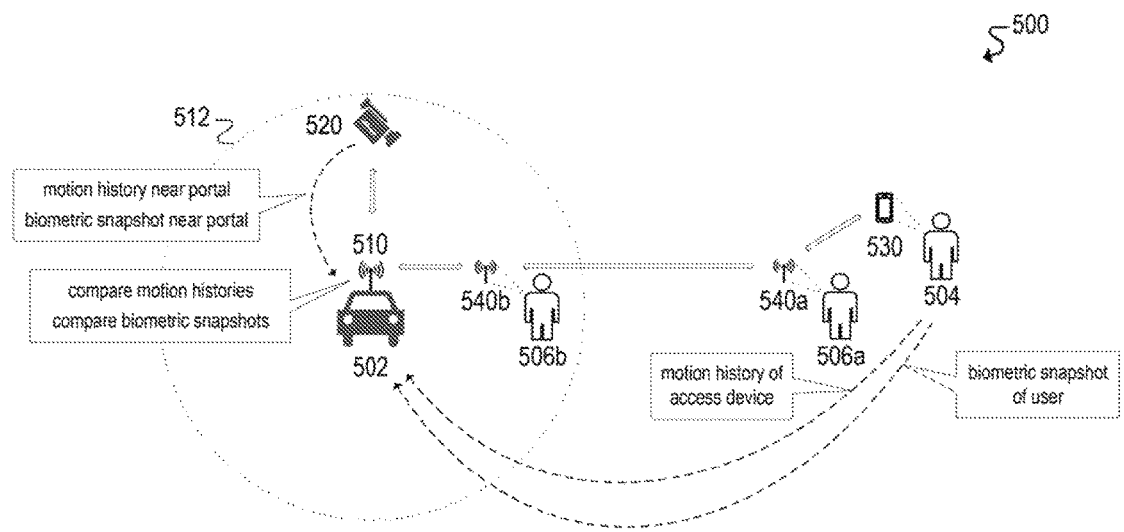
Figure 5D:
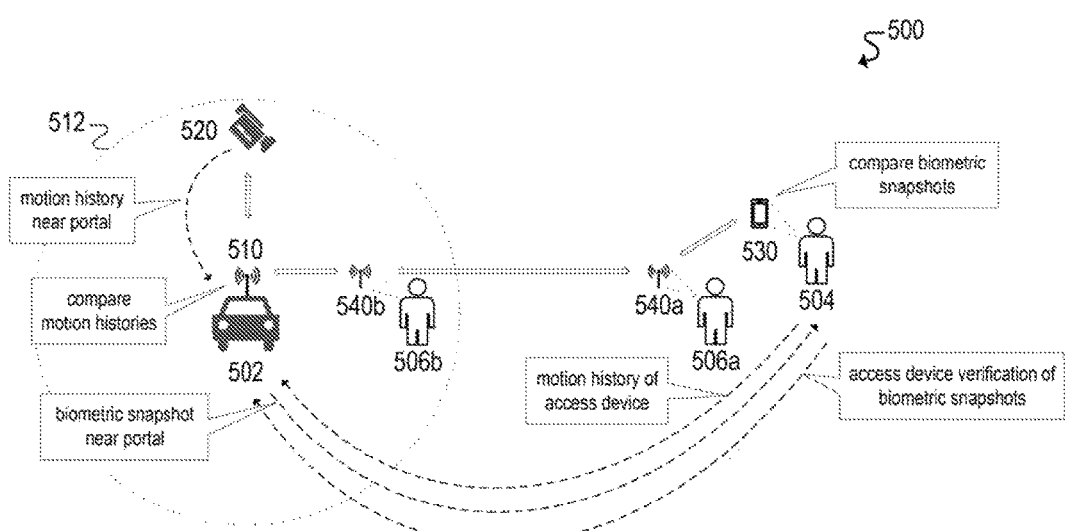

As described further below, FIGS. 5B-D illustrate various embodiments of surveillance-based relay attack prevention 500 based on both motion tracking and biometric authentication. The approach illustrated in FIG. 5B is less complex but requires user interaction, while the approaches illustrated in FIGS. 5C-D rely on advanced machine learning techniques and thus are more complex but do not require user interaction.

FIG. 5B illustrates an example of surveillance-based relay attack prevention based on motion tracking and user verification of biometric snapshots. In the illustrated example, the surveillance-based relay attack prevention functionality is implemented using the following steps:

Step 1: The access device 530 attempts to communicate with the access portal 510 over an encrypted secure link. The communication is initiated without user intervention, for example, based on wireless beacons that are continuously transmitted by either the access device 530 or the access portal 510.

Step 2: If communication is possible, the access device 530 transmits its associated access token over the secure link, and the access portal 510 verifies whether the access token is valid.

Step 3: If the access token is valid, the access portal 510 determines the distance between the access device 530 and the access portal 510. In some embodiments, for example, the distance between the respective devices may be determined based on characteristics of the wireless signals transmitted between the devices, such as signal strength, signal phase, and/or signal timing information, among other examples.

Step 4: The measured distance is compared to a threshold distance to determine whether the access device 530 is potentially within the requisite proximity 512 of the access portal 510. If the measured distance is less than the threshold distance, the access device 530 is presumably within the requisite proximity of the access portal 510 unless a relay attack is in progress. Accordingly, prior to granting the access request, additional verifications are performed using the remaining steps to determine if a relay attack is in progress.

Step 5: The access device 530 sends its own measured motion history over the encrypted link to the access portal 510.

Step 6: The access portal 510 obtains the motion histories of every person near the access portal 510 based on data captured by the surveillance system 520.

Step 7: The access portal 510 analyzes the motion histories obtained from the surveillance system 520 to identify motions that are plausibly associated with persons approaching the access portal 510, and the motion history of each identified person is then compared with the motion history of the access device 530. The access portal 510 further obtains a biometric snapshot of the person (or persons) whose motion history best matches the corresponding motion history of the access device 530. In the illustrated example, the biometric snapshot is an image captured by the surveillance system 520.

Step 8: The access portal 510 communicates the identified image snapshot(s) over an encrypted channel back to the access device 530.

Step 9: The person 504 holding the access device 530 is notified of the response from the access portal 510 and is presented with the image snapshot.

Step 10: If the image snapshot corresponds to the correct physical appearance of the person 504 holding the access device 530, then the person 504 initiates the remainder of the access transaction by confirming that the image snapshot is legitimate via user interaction with the access device 530, and the access device 530 then replies to the access portal 510 over the encrypted channel with an authenticated confirmation code.

Step 11: The access portal 510 verifies the confirmation code received from the access device 530, and if the confirmation code is correct, the access portal 510 performs the appropriate action requested by the access device 530 (e.g., unlocking or opening a door).

The security of this embodiment is based on the assumption that the person 504 holding the access device 530 is the rightful owner of the access device 530 or the associated access token. It is also based on the assumption that the physical appearance of the person 504 holding the access device 530 can be distinguished from other third parties near the access portal 510, and that the person 504 is a human that can successfully recognize whether or not a given image shows the person at a specific time and place. The attackers 506 can still relay, block, or corrupt the encrypted image data. However, since the communication channel between the access device 530 and the access portal 510 is encrypted and authenticated, any action of the attackers 506 will result in the relay attack being identified. For example, if the image snapshot is successfully forwarded to the person 504 holding the access device 530, that person 504 will determine that the image is incorrect and will block the attack. On the other hand, if the attackers 506 block or corrupt the image data, the communication will result in a failure, and thus the attack will be similarly detected and prevented.

This embodiment requires the person 504 holding the access device 530 to actively react to the image snapshot sent by the access portal 510. This embodiment also leaks information about the surrounding environment of the access portal 510, particularly if the access portal 510 sends image snapshots and motion histories of multiple plausible persons rather than a single person. Moreover, face obfuscation techniques cannot be applied in this case, as the person 504 holding the access device 530 needs to be able to inspect the image snapshot sent by the access portal 510. The security of this embodiment depends largely on the ability of the person 504 holding the access device 530 to recognize and classify image data.

FIG. 5C illustrates an example of surveillance-based relay attack prevention based on motion tracking and biometric authentication performed by the access portal. The illustrated embodiment avoids leaking sensitive information outside the access portal 510, but it also requires computer vision and/or machine learning algorithms that are capable of reliably detecting a match between a pair of images. For example, in the illustrated embodiment, image capture is performed by both the surveillance system 520 and the person 504 holding the access device 530, and image recognition is performed by the access portal 510 using machine learning techniques. In this manner, no user interaction is required.

In the illustrated example, the surveillance-based relay attack prevention functionality is implemented using the following steps:

Step 1: The access device 530 attempts to communicate with the access portal 510 over an encrypted secure link. The communication is initiated without user intervention, for example, based on wireless beacons that are continuously transmitted by either the access device 530 or the access portal 510.

Step 2: If communication is possible, the access device 530 transmits its associated access token over the secure link, and the access portal 510 verifies whether the access token is valid.

Step 3: If the access token is valid, the access portal 510 determines the distance between the access device 530 and the access portal 510. In some embodiments, for example, the distance between the respective devices may be determined based on characteristics of the wireless signals transmitted between the devices, such as signal strength, signal phase, and/or signal timing information, among other examples.

Step 4: The measured distance is compared to a threshold distance to determine whether the access device 530 is potentially within the requisite proximity 512 of the access portal 510. If the measured distance is less than the threshold distance, the access device 530 is presumably within the requisite proximity of the access portal 510 unless a relay attack is in progress. Accordingly, prior to granting the access request, additional verifications are performed using the remaining steps to determine if a relay attack is in progress.

Step 5: The person 504 holding the access device 530 captures a biometric snapshot of himself or herself. In the illustrated example, the biometric snapshot is an image of the person 504 (e.g., captured using a camera of the access device 530 or otherwise obtained from another source). Any faces in the snapshot of other people who are near the person 504 are obfuscated.

In some embodiments, this step may only be performed once and/or in advance of any interaction with the access portal 510.

Step 6: The access device 530 sends its own measured motion history along with the image snapshot over the encrypted link to the access portal 510.

Step 7: The access portal 510 obtains the motion histories of every person near the access portal 510 based on data captured by the surveillance system 520.

Step 8: The access portal 510 analyzes the motion histories obtained from the surveillance system 520 to identify motions that are plausibly associated with persons approaching the access portal 510, and the access portal 510 then compares the motion history of each identified person with the motion history of the access device 530.

Step 9: The access portal 510 obtains a biometric snapshot of the person (or persons) whose motion history best matches the corresponding motion history of the access device 530. In the illustrated example, the biometric snapshot is an image captured by the surveillance system 520.

The access portal 510 then compares the snapshot of the identified person(s) near the access portal 510 with the snapshot of the person 504 holding the access device 530. In some embodiments, for example, the comparison may be performed using well-known computer vision and/or machine learning techniques. Moreover, in some embodiments, various image preprocessing techniques may be employed to facilitate the comparisons, such as a background subtraction algorithm used to isolate the human faces that appear in the snapshots.

Step 10: If a match is found between the snapshot of a person near the access portal 510 and the snapshot of the person 504 holding the access device 510, then presumably no relay attack is being performed, and thus the access portal 510 performs the appropriate action requested by the access device 530 (e.g., unlocking or opening a door).

The security of this embodiment is guaranteed by the fact that the image snapshot sent from the access device 530 to the access portal 510 via the encrypted communication channel is associated only with the physical appearance of the rightful owner 504 of the access device 530 (or the associated access token) and no one else. A relay attack cannot be successful against this embodiment unless the encryption key is known. If the encryption key is not known, it is practically impossible for an attacker 506 to fool the access portal 510 by injecting a snapshot into the communication channel. Finally, this embodiment can be implemented without any user interaction, although user interaction may still be leveraged in some cases depending on the particular implementation.

FIG. 5D illustrates an example of surveillance-based relay attack prevention based on motion tracking and biometric authentication initiated by the access device. For example, in this embodiment, image matching is performed by the access device 530 directly, or at least initiated by the access device 530 (e.g., before being performed by another component, such as in the cloud). Accordingly, this embodiment similarly requires computer vision and/or machine learning algorithms that are capable of reliably matching images. Moreover, this embodiment can be implemented without any user interaction, although user interaction can still be leveraged in some cases depending on the particular implementation.

In the illustrated example, the surveillance-based relay attack prevention functionality is implemented using the following steps:

Step 1: The access device 530 attempts to communicate with the access portal 510 over an encrypted secure link. The communication is initiated without user intervention, for example, based on wireless beacons that are continuously transmitted by either the access device 530 or the access portal 510.

Step 2: If communication is possible, the access device 530 transmits its associated access token over the secure link, and the access portal 510 verifies whether the access token is valid.

Step 3: If the access token is valid, the access portal 510 determines the distance between the access device 530 and the access portal 510. In some embodiments, for example, the distance between the respective devices may be determined based on characteristics of the wireless signals transmitted between the devices, such as signal strength, signal phase, and/or signal timing information, among other examples.

Step 4: The measured distance is compared to a threshold distance to determine whether the access device 530 is potentially within the requisite proximity 512 of the access portal 510. If the measured distance is less than the threshold distance, the access device 530 is presumably within the requisite proximity of the access portal 510 unless a relay attack is in progress. Accordingly, prior to granting the access request, additional verifications are performed using the remaining steps to determine if a relay attack is in progress.

Step 5: The access device 530 sends its own measured motion history over the encrypted link to the access portal 510.

Step 6: The access portal 510 obtains the motion histories of every person near the access portal 510 based on data captured by the surveillance system 520.

Step 7: The access portal 510 analyzes the motion histories obtained from the surveillance system 520 to identify motions that are plausibly associated with persons approaching the access portal 510, and the motion history of each identified person is then compared with the motion history of the access device 530. The access portal 510 further obtains a biometric snapshot of the person (or persons) whose motion history best matches the corresponding motion history of the access device 530. In the illustrated example, the biometric snapshot is an image captured by the surveillance system 520. Any faces that are inadvertently captured in the snapshot and not required for the comparisons are obfuscated.

Step 8: The access portal 510 communicates the snapshot of each potentially matching person identified near the access portal 510 to the access device 530 via the encrypted channel.

Step 9: The access device 530 initiates a comparison between a stored image of the user 504 holding the access device 530 and the snapshot(s) of potentially matching person(s) identified near the access portal 510.

Step 10: If a match is identified, the access device 530 replies to the access portal 510 with an authenticated confirmation code via the encrypted channel.

If a match is not identified, however, then the access device 530 prompts the user 504 to manually review the snapshot(s). If the user 504 perceives that the snapshot(s) depict somebody other than the user, then a relay attack is detected. On the other hand, if the user 504 indicates that the snapshot(s) are legitimate (e.g., via user interaction with the access device 530), the access device 530 replies to the access portal 310 with an authenticated confirmation code via the encrypted channel.

Step 11: The access portal 510 verifies the confirmation code received from the access device 530, and if the confirmation code is correct, the access portal 510 performs the appropriate action requested by the access device 530 (e.g., unlocking or opening a door).

The embodiment of FIG. 5D is similar to that of FIG. 5B, except the image matching task performed manually in FIG. 5B is now performed automatically in FIG. 5D using computer vision and/or machine learning techniques. In this manner, unnecessary user interaction can be avoided. Moreover, in FIG. 5D, the image snapshot of the user 504 of the access device 530 is taken off-line and stored only in the access device 530, or the snapshot is stored in the cloud. The embodiment of FIG. 5C could be implemented in a similar manner. In general, the embodiments of FIGS. 5C and 5D place more importance on the automatic image recognition aspects. Specifically, these embodiments leverage computer vision and machine learning techniques that are capable of successfully recognizing the holder of an access device or token regardless of the circumstances, such as when their appearance has changed or in varying lighting conditions, among other examples. This is possible in view of the advances in computer vision and machine learning which are now available (e.g., deformable part models, light invariant feature techniques, and so forth).

Figure 6:
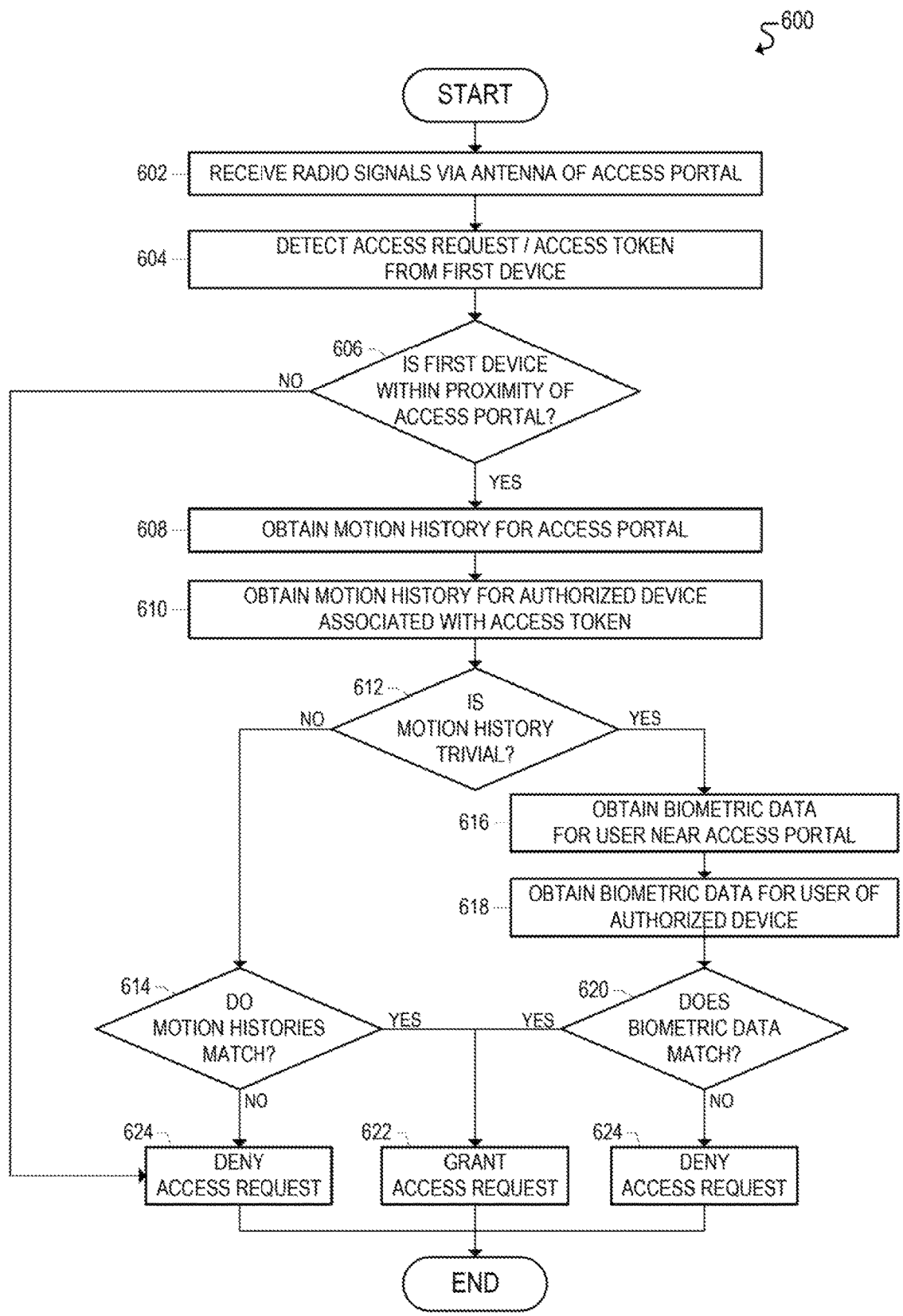
FIG. 6 illustrates a flowchart for an example embodiment of surveillance-based relay attack prevention.

FIG. 6 illustrates a flowchart 600 for an example embodiment of surveillance-based relay attack prevention. In some embodiments, for example, flowchart 600 may be used to detect and prevent relay attacks against proximity-based access systems. Flowchart 600 may be implemented, in some embodiments, using the embodiments and functionality described throughout this disclosure.

The flowchart may begin at block 602 by receiving radio signals via an antenna of a proximity-based access portal. In some embodiments, for example, the proximity-based access portal may be used to control or manage access to a particular asset, such as a vehicle, building, and/or payment system, among other examples. For example, in some embodiments, the access portal may only grant access to the protected asset to authorized users that are in close physical proximity to the access portal. In some embodiments, for example, an authorized user near the access portal may obtain access to the protected asset using an access device with a valid access token. An access device, for example, can be any device that is capable of communicating with the access portal, including mobile phones, smart keys or key fobs, access cards, payment cards, and RFID tags, among other examples. Moreover, an access token may be a unique token associated with an authorized user and/or an associated access device of the authorized user.

The flowchart may then proceed to block 604 to detect an access request and an associated access token from a first device based on the radio signals received by the access portal. Accordingly, in some embodiments, the access portal may first verify that the access token is a valid token of an authorized user and/or an authorized access device.

The flowchart may then proceed to block 606 to determine whether the first device is within the requisite proximity of the access portal. For example, because the access portal may only grant access to authorized devices that are within close proximity of the access portal, the access portal may confirm that the first device is actually within the requisite proximity of the access portal. In some embodiments, for example, the access portal may compute the distance to the first device based on characteristics of the wireless signals received from the first device, such as signal strength, signal phase, and/or signal timing information. The access portal may then determine whether the computed distance is less than a threshold distance that corresponds to the requisite access proximity of the access portal.

If it is determined that the first device is not within the requisite proximity of the access portal, the flowchart may proceed to block 624 to deny the access request.

If it is determined that the first device is within the requisite proximity of the access portal, however, the flowchart may proceed to block 608 to obtain the motion history of people near the access portal. In some embodiments, for example, a surveillance system with one or more cameras and/or other types of sensors may be used to track the movement of people near the access portal.

The flowchart may then proceed to block 610 to obtain the motion history of an authorized access device that is associated with the access token specified in the access request. For example, the authorized access device associated with the access token may track its own movement using built-in sensor(s), such as a GPS chips and/or other types of absolute location sensors, accelerometers, and so forth. Moreover, the motion history of the authorized access device can be obtained from the first device that sent the access request regardless of whether a relay attack is in progress. For example, if no relay attack is in progress, the first device and the authorized access device are the same device. If a relay attack is in progress, however, the first device is a separate device that is relaying signals between the access portal and the authorized access device. In either scenario, the motion history of the authorized device can be obtained either directly or indirectly from the first device.

The flowchart may then proceed to block 612 to determine whether the motion history of the authorized access device is trivial. In some embodiments, for example, an attacker may be able to fake or mimic the motion history of an authorized access device if the access device is stationary or is only moving a very minor or "trivial" amount.

Accordingly, if it is determined that the motion history of the authorized access device is not trivial, the flowchart may proceed to block 614 to compare the respective motion histories of people detected near the access portal and of the authorized access device to determine if they match. If the motion histories match, the flowchart may proceed to block 622 to grant the access request, otherwise the flowchart may proceed to block 624 to deny the access request.

However, if it is determined that the motion history of the authorized access device is trivial, additional biometric verifications may be performed before deciding whether to grant or deny the access request. Accordingly, the flowchart may proceed to block 616 to obtain biometric data for a user (or users) detected near the access portal, and then to block 618 to obtain biometric data for the actual user of the authorized access device.

The flowchart may then proceed to block 620 to determine whether the biometric data of the user near the access portal matches the biometric data of the actual user of the authorized access device. If the biometric data matches, the flowchart may proceed to block 622 to grant the access request, otherwise the flowchart may proceed to block 624 to deny the access request.

At this point, the flowchart may be complete. In some embodiments, however, the flowchart may restart and/or certain blocks may be repeated. For example, in some embodiments, the flowchart may restart at block 602 to continue detecting potential relay attacks.

Example Computing Architectures

Figure 7:
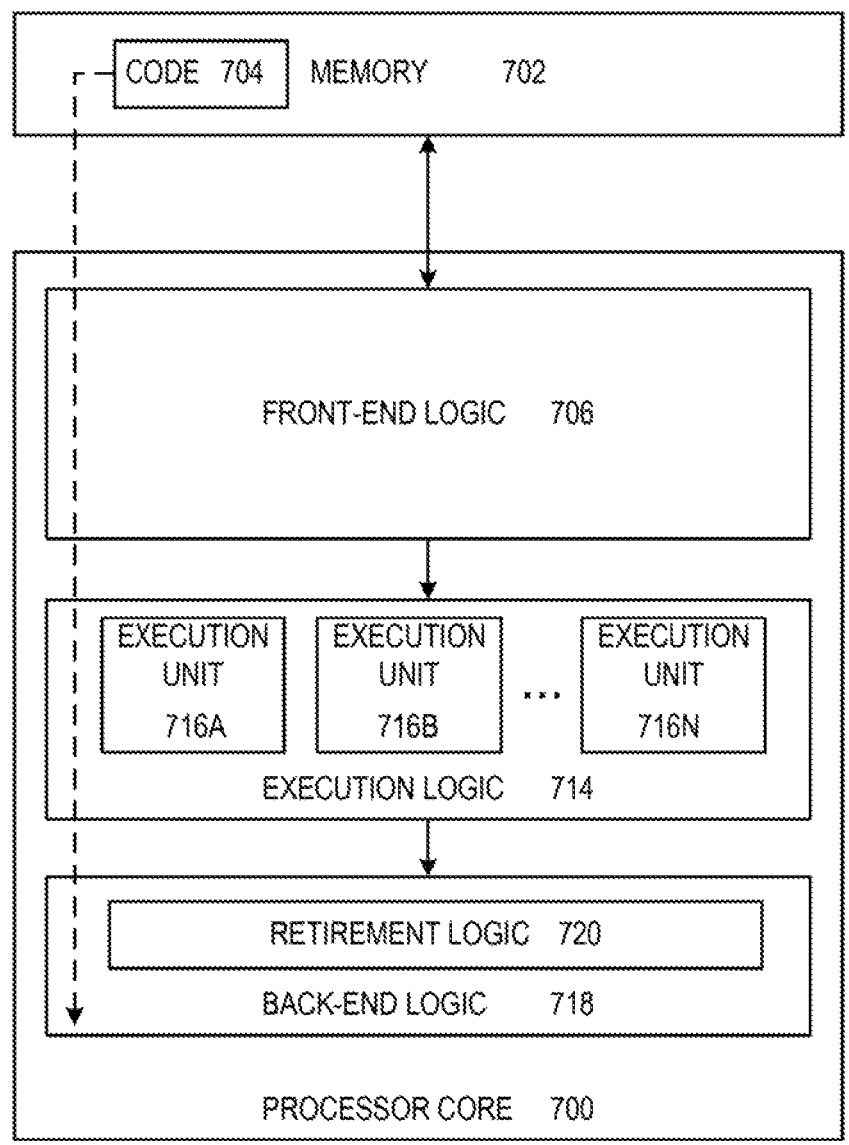
FIGS. 7, 8, and 9 illustrate example computer architectures that can be used in accordance with embodiments disclosed herein.
Figure 8:
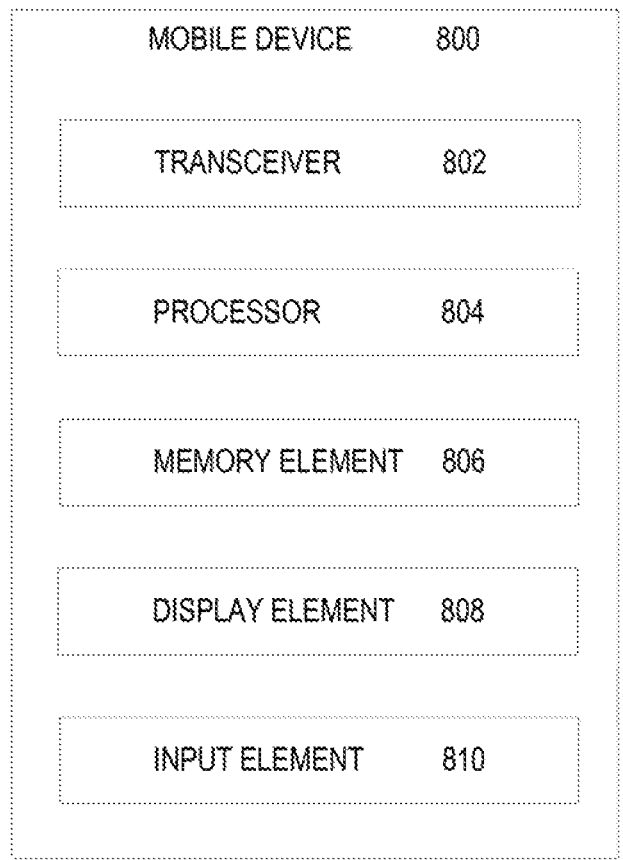
Figure 9:
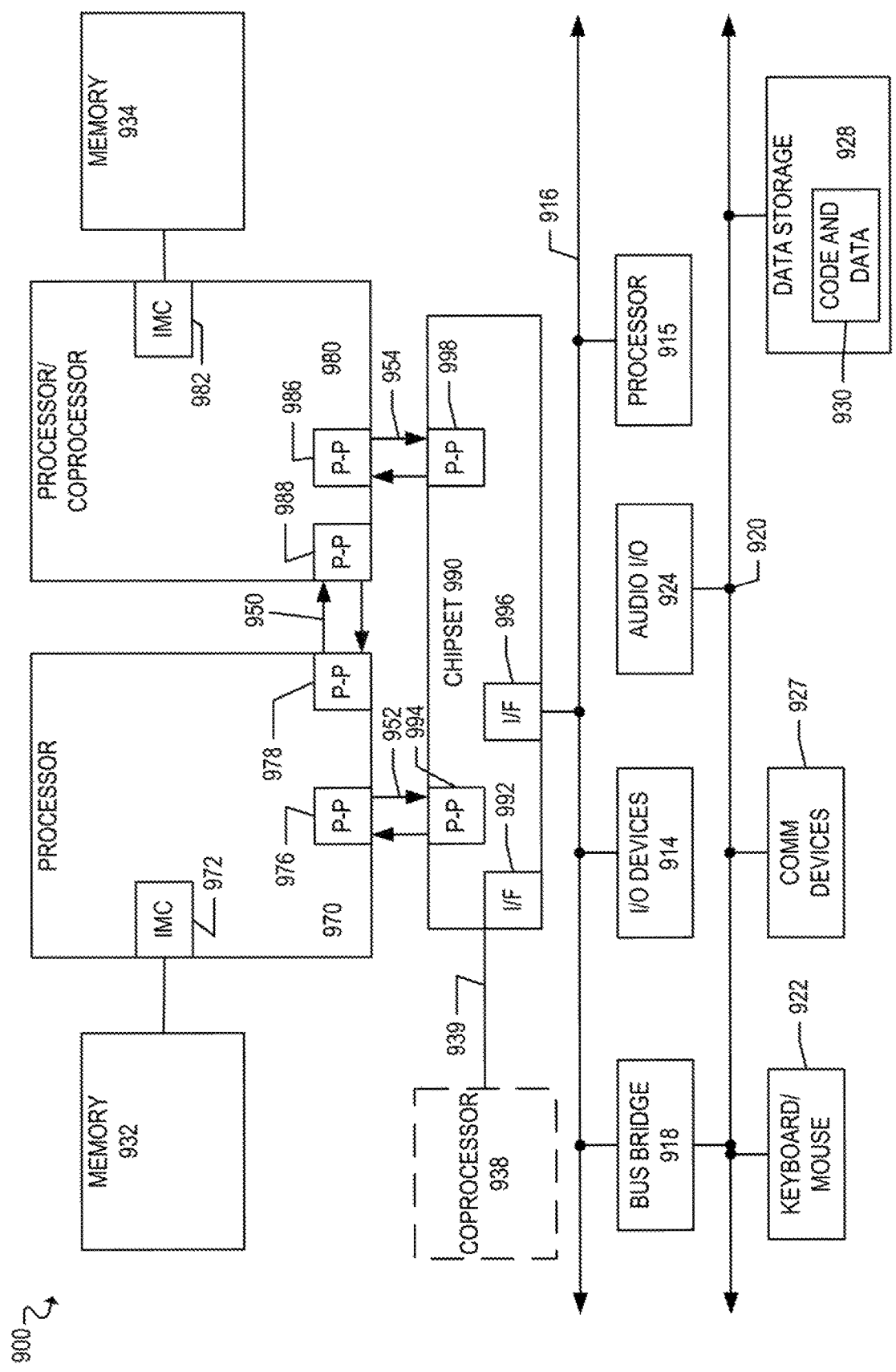

FIGS. 7-9 illustrate example computer architectures that can be used in accordance with embodiments disclosed herein. For example, in various embodiments, the computer architectures of FIGS. 7-9 may be used to implement the relay attack prevention functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 7 illustrates a block diagram for an example embodiment of a processor 700. Processor 700 is an example of a type of hardware device that can be used in connection with the embodiments described throughout this disclosure. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 may also include register renaming logic and scheduling logic, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a block diagram for an example embodiment of a mobile device 800. Mobile device 800 is an example of a possible computing system (e.g., a host or endpoint device) of the examples and implementations described herein. In an embodiment, mobile device 800 operates as a transmitter and a receiver of wireless communications signals. Specifically, in one example, mobile device 800 may be capable of both transmitting and receiving cellular network voice and data mobile services. Mobile services include such functionality as full Internet access, downloadable and streaming video content, as well as voice telephone communications.

Mobile device 800 may correspond to a conventional wireless or cellular portable telephone, such as a handset that is capable of receiving "3G", or "third generation" cellular services. In another example, mobile device 800 may be capable of transmitting and receiving "4G" mobile services as well, or any other mobile service.

Examples of devices that can correspond to mobile device 800 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 800 illustrated in FIG. 8 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 800 includes a transceiver 802, which is connected to and in communication with an antenna. Transceiver 802 may be a radio frequency transceiver. Also, wireless signals may be transmitted and received via transceiver 802. Transceiver 802 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 802 is connected to a processor 804, which may perform the bulk of the digital signal processing of signals to be communicated and signals received, at the baseband frequency. Processor 804 can provide a graphics interface to a display element 808, for the display of text, graphics, and video to a user, as well as an input element 810 for accepting inputs from users, such as a touchpad, keypad, roller mouse, and other examples. Processor 804 may include an embodiment such as that shown and described with reference to processor 700 of FIG. 7.

In an aspect of this disclosure, processor 804 may be a processor that can execute any type of instructions to achieve the functionality and operations as detailed herein. Processor 804 may also be coupled to a memory element 806 for storing information and data used in operations performed using the processor 804. Additional details of an example processor 804 and memory element 806 are subsequently described herein. In an example embodiment, mobile device 800 may be designed with a system-on-a-chip (SoC) architecture, which integrates many or all components of the mobile device into a single chip, in at least some embodiments.

FIG. 9 illustrates a block diagram for an example embodiment of a multiprocessor 900. As shown in FIG. 9, multiprocessor system 900 is a point-to-point interconnect system, and includes a first processor 970 and a second processor 980 coupled via a point-to-point interconnect 950. In some embodiments, each of processors 970 and 980 may be some version of processor 700 of FIG. 7.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of this disclosure is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

All or part of any component of FIG. 9 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: an antenna to receive one or more radio signals, wherein the antenna is associated with a proximity-based access portal; and a processor to: detect, based on the one or more radio signals, an access request from a first device, wherein the access request comprises a request to access the proximity-based access portal using an access token associated with an authorized device; determine, based on the one or more radio signals, that the first device is within a particular proximity of the proximity-based access portal; obtain a first motion history associated with movement detected near the proximity-based access portal; obtain a second motion history associated with movement detected by the authorized device; and determine, based on the first motion history and the second motion history, whether the movement detected near the proximity-based access portal matches the movement detected by the authorized device.

In one example embodiment of an apparatus: the first motion history is obtained based on data captured by one or more first sensors associated with the proximity-based access portal; and the second motion history is obtained based on data captured by one or more second sensors associated with the authorized device.

In one example embodiment of an apparatus, the processor is further to: grant the access request upon determining that the movement detected near the proximity-based access portal matches the movement detected by the authorized device; and deny the access request upon determining that the movement detected near the proximity-based access portal does not match the movement detected by the authorized device.

In one example embodiment of an apparatus, the processor is further to: determine, based on the first motion history and the second motion history, that the movement detected near the proximity-based access portal does not match the movement detected by the authorized device; detect a relay attack associated with the access request, wherein the relay attack is detected based at least in part on determining that the movement detected near the proximity-based access portal does not match the movement detected by the authorized device; and deny the access request based on detection of the relay attack.

In one example embodiment of an apparatus, the processor is further to: obtain first biometric data associated with a first user detected near the proximity-based access portal; and determine, based on the first biometric data, whether the first user is an authorized user of the authorized device.

In one example embodiment of an apparatus, the processor to determine, based on the first biometric data, whether the first user is the authorized user of the authorized device is further to: obtain second biometric data associated with the authorized user; and determine, based on the first biometric data and the second biometric data, whether the first user and the authorized user are a same user.

In one example embodiment of an apparatus, the processor to determine, based on the first biometric data, whether the first user is the authorized user of the authorized device is further to: send the first biometric data associated with the first user to the authorized device; and receive an indication from the authorized device of whether the first user is the authorized user.

In one example embodiment of an apparatus, the processor is further to: determine, based on the first biometric data, that the first user is not the authorized user of the authorized device; detect a relay attack associated with the access request, wherein the relay attack is detected based at least in part on determining that the first user is not the authorized user of the authorized device; and deny the access request based on detection of the relay attack.

In one example embodiment of an apparatus, the processor is further to: determine, based on the second motion history, that the movement detected by the authorized device is below a threshold level of movement; and obtain the first biometric data based at least in part on determining that the movement detected by the authorized device is below the threshold level of movement.

In one example embodiment of an apparatus, the first biometric data comprises a visual representation of the first user.

One or more embodiments may include at least one machine accessible storage medium having instructions stored thereon, wherein the instructions, when executed on a machine, cause the machine to: receive one or more radio signals via an antenna, wherein the antenna is associated with a proximity-based access portal; detect, based on the one or more radio signals, an access request from a first device, wherein the access request comprises a request to access the proximity-based access portal using an access token associated with an authorized device; determine, based on the one or more radio signals, that the first device is within a particular proximity of the proximity-based access portal; obtain a first motion history associated with movement detected near the proximity-based access portal; obtain a second motion history associated with movement detected by the authorized device; and determine, based on the first motion history and the second motion history, whether the movement detected near the proximity-based access portal matches the movement detected by the authorized device.

In one example embodiment of a storage medium, the instructions further cause the machine to: determine, based on the first motion history and the second motion history, that the movement detected near the proximity-based access portal does not match the movement detected by the authorized device; detect a relay attack associated with the access request, wherein the relay attack is detected based at least in part on determining that the movement detected near the proximity-based access portal does not match the movement detected by the authorized device; and deny the access request based on detection of the relay attack.

In one example embodiment of a storage medium, the instructions further cause the machine to: obtain first biometric data associated with a first user detected near the proximity-based access portal; and determine, based on the first biometric data, whether the first user is an authorized user of the authorized device.

In one example embodiment of a storage medium, the instructions further cause the machine to: determine, based on the first biometric data, that the first user is not the authorized user of the authorized device; detect a relay attack associated with the access request, wherein the relay attack is detected based at least in part on determining that the first user is not the authorized user of the authorized device; and deny the access request based on detection of the relay attack.

One or more embodiments may include a system, comprising: an antenna to receive one or more radio signals, wherein the antenna is associated with a proximity-based access portal; one or more sensors to capture data associated with an environment near the proximity-based access portal; and a processor to: detect, based on the one or more radio signals, an access request from a first device, wherein the access request comprises a request to access the proximity-based access portal using an access token associated with an authorized device; determine, based on the one or more radio signals, that the first device is within a particular proximity of the proximity-based access portal; obtain a first motion history associated with movement detected near the proximity-based access portal, wherein the movement detected near the proximity-based access portal is detected based on the data captured by the one or more sensors; obtain a second motion history associated with movement detected by the authorized device; and determine, based on the first motion history and the second motion history, whether the movement detected near the proximity-based access portal matches the movement detected by the authorized device.

In one example embodiment of a system, the one or more sensors comprise a camera.

In one example embodiment of a system, the processor to obtain the first motion history associated with movement detected near the proximity-based access portal is further to: obtain visual data associated with the environment near the proximity-based access portal, wherein the visual data is captured by the camera; detect movement near the proximity-based access portal based on the visual data; and generate the first motion history based on the movement detected near the proximity-based access portal.

In one example embodiment of a system, the processor is further to: obtain first biometric data associated with a first user detected near the proximity-based access portal; and determine, based on the first biometric data, whether the first user is an authorized user of the authorized device.

In one example embodiment of a system, the processor to obtain first biometric data associated with the first user detected near the proximity-based access portal is further to: obtain visual data associated with the environment near the proximity-based access portal, wherein the visual data is captured by the camera; detect the first user near the proximity-based access portal based on the visual data; and generate the first biometric data based on the visual data associated with the first user.

In one example embodiment of a system, the processor is further to: detect a relay attack associated with the access request upon determining that: the movement detected near the proximity-based access portal does not match the movement detected by the authorized device; or the first user is not the authorized user of the authorized device; and deny the access request based on detection of the relay attack.

What is claimed is:

1. An apparatus for providing a proximity-based access portal, comprising:
   an antenna; and
   a processor to:
   receive, via the antenna, an access request for the proximity-based access portal, wherein the access request comprises an access token associated with an authorized device;
   obtain a first motion history representing movement detected near the proximity-based access portal during a particular timeframe, wherein the first motion history is generated based at least in part on one or more radio signals received by the antenna;
   obtain a second motion history representing movement of the authorized device during the particular timeframe, wherein the second motion history is generated by the authorized device;
   determine, based on comparing the first motion history and the second motion history, whether the movement detected near the proximity-based access portal matches the movement of the authorized device;
   detect a relay attack associated with the access request, wherein the relay attack is detected based at least in part on determining that the movement detected near the proximity-based access portal does not match the movement of the authorized device; and
   deny the access request based on detecting the relay attack.

2. The apparatus of claim 1, wherein:
   the processor to obtain the first motion history representing movement detected near the proximity-based access portal during the particular timeframe is further to:
   generate the first motion history based at least in part on analyzing the one or more radio signals received by the antenna; and
   the processor to obtain the second motion history representing movement of the authorized device during the particular timeframe is further to:
   receive, via the antenna, the second motion history, wherein the second motion history is generated by the authorized device based at least in part on data captured by one or more sensors associated with the authorized device.

3. The apparatus of claim 1, wherein the processor is further to:
   obtain first biometric data associated with a first user detected near the proximity-based access portal; and
   determine, based on the first biometric data, whether the first user is an authorized user of the authorized device.

4. The apparatus of claim 3, wherein the processor to determine, based on the first biometric data, whether the first user is the authorized user of the authorized device is further to:
   obtain second biometric data associated with the authorized user; and
   determine, based on the first biometric data and the second biometric data, whether the first user and the authorized user are a same user.

5. The apparatus of claim 3, wherein the processor to determine, based on the first biometric data, whether the first user is the authorized user of the authorized device is further to:
  send the first biometric data associated with the first user to the authorized device; and
  receive an indication from the authorized device of whether the first user is the authorized user.

6. The apparatus of claim 3, wherein the processor to detect the relay attack associated with the access request is further to:
  detect the relay attack associated with the access request based at least in part on determining that the first user is not the authorized user of the authorized device.

7. The apparatus of claim 3, wherein the processor is further to:
  determine, based on the second motion history, that the movement of the authorized device is below a threshold level of movement; and
  obtain the first biometric data based at least in part on determining that the movement of the authorized device is below the threshold level of movement.

8. The apparatus of claim 3, wherein the first biometric data comprises a visual representation of the first user.

9. At least one non-transitory machine accessible storage medium having instructions stored thereon, wherein the instructions, when executed on a machine, cause the machine to:
  receive, via an antenna, an access request for a proximity-based access portal, wherein the access request comprises an access token associated with an authorized device;
  obtain a first motion history representing movement detected near the proximity-based access portal during a particular timeframe, wherein the first motion history is generated based at least in part on one or more radio signals received by the antenna;
  obtain a second motion history representing movement of the authorized device during the particular timeframe, wherein the second motion history is generated by the authorized device;
  determine, based on comparing the first motion history and the second motion history, whether the movement detected near the proximity-based access portal matches the movement of the authorized device;
  detect a relay attack associated with the access request, wherein the relay attack is detected based at least in part on determining that the movement detected near the proximity-based access portal does not match the movement of the authorized device; and
  deny the access request based on detecting the relay attack.

10. The storage medium of claim 9, wherein the instructions further cause the machine to:
  obtain first biometric data associated with a first user detected near the proximity-based access portal; and
  determine, based on the first biometric data, whether the first user is an authorized user of the authorized device.

11. The storage medium of claim 10, wherein the instructions that cause the machine to detect the relay attack associated with the access request further cause the machine to:
  detect the relay attack associated with the access request based at least in part on determining that the first user is not the authorized user of the authorized device.

12. A system for providing a proximity-based access portal, comprising:
  an antenna;
  one or more sensors to capture sensor data associated with an environment near the proximity-based access portal; and
  a processor to:
    receive, via the antenna, an access request for the proximity-based access portal, wherein the access request comprises an access token associated with an authorized device;
    obtain a first motion history representing movement detected near the proximity-based access portal during a particular timeframe, wherein the first motion history is generated based at least in part on the sensor data captured by the one or more sensors;
    obtain a second motion history representing movement of the authorized device during the particular timeframe, wherein the second motion history is generated by the authorized device;
    determine, based on comparing the first motion history and the second motion history, whether the movement detected near the proximity-based access portal matches the movement of the authorized device;
    detect a relay attack associated with the access request, wherein the relay attack is detected based at least in part on determining that the movement detected near the proximity-based access portal does not match the movement of the authorized device; and
    deny the access request based on detecting the relay attack.

13. The system of claim 12, wherein the one or more sensors comprise a camera.

14. The system of claim 13, wherein the processor to obtain the first motion history representing movement detected near the proximity-based access portal during the particular timeframe is further to:
  obtain visual data associated with the environment near the proximity-based access portal, wherein the visual data is captured by the camera;
  detect movement near the proximity-based access portal based on the visual data; and
  generate the first motion history based on the movement detected near the proximity-based access portal.

15. The system of claim 13, wherein the processor is further to:
  obtain first biometric data associated with a first user detected near the proximity-based access portal; and
  determine, based on the first biometric data, whether the first user is an authorized user of the authorized device.

16. The system of claim 15, wherein the processor to obtain first biometric data associated with the first user detected near the proximity-based access portal is further to:
  obtain visual data associated with the environment near the proximity-based access portal, wherein the visual data is captured by the camera;
  detect the first user near the proximity-based access portal based on the visual data; and
  generate the first biometric data based on the visual data associated with the first user.

17. The system of claim 15, wherein the processor to detect the relay attack associated with the access request is further to:
  detect the relay attack associated with the access request based at least in part on determining that the first user is not the authorized user of the authorized device.

* * * * *